United States Patent
Goel et al.

(10) Patent No.: US 10,796,407 B2
(45) Date of Patent: Oct. 6, 2020

(54) FOVEATED DOMAIN STORAGE AND PROCESSING

(71) Applicant: Samsung Electronics Co., Ltd., Suwon-si (KR)

(72) Inventors: Manish Goel, Plano, TX (US); Akila Subramaniam, Allen, TX (US); Hideo Tamama, McKinney, TX (US); Jeffrey Tang, Plano, TX (US); Seok-Jun Lee, Allen, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 200 days.

(21) Appl. No.: 15/977,839

(22) Filed: May 11, 2018

(65) Prior Publication Data
US 2019/0347763 A1 Nov. 14, 2019

(51) Int. Cl.
| | |
|---|---|
| *G06T 3/40* | (2006.01) |
| *G06F 3/01* | (2006.01) |
| *G06T 3/00* | (2006.01) |
| *G06T 7/11* | (2017.01) |
| *G06T 7/20* | (2017.01) |

(52) U.S. Cl.
CPC ............... *G06T 3/40* (2013.01); *G06F 3/012* (2013.01); *G06F 3/013* (2013.01); *G06T 3/0093* (2013.01); *G06T 7/11* (2017.01); *G06T 7/20* (2013.01); *G06T 2207/20021* (2013.01); *G06T 2207/30201* (2013.01)

(58) Field of Classification Search
None
See application file for complete search history.

(56) References Cited

U.S. PATENT DOCUMENTS

| | | |
|---|---|---|
| 6,252,989 B1 | 6/2001 | Geisler et al. |
| 8,508,621 B2 | 8/2013 | Cote et al. |
| 9,030,583 B2 | 5/2015 | Gove et al. |
| 9,207,426 B2 | 12/2015 | Kawase et al. |
| 9,230,302 B1 | 1/2016 | Owechko et al. |
| 9,661,245 B2 | 5/2017 | Kawano |
| 2011/0273621 A1 | 11/2011 | Richardson et al. |
| 2013/0070109 A1 | 3/2013 | Gove et al. |
| 2014/0247277 A1 | 9/2014 | Guenter et al. |

(Continued)

FOREIGN PATENT DOCUMENTS

| | | |
|---|---|---|
| EP | 3075140 A1 | 10/2016 |
| WO | WO2013043259 A1 | 3/2013 |
| WO | 2018022250 A1 | 2/2018 |

OTHER PUBLICATIONS

Pohl D, Bolkart T, Nickels S, Grau O. Using astigmatism in wide angle HMDs to improve rendering. In2015 IEEE Virtual Reality (VR) Mar. 23, 2015 (pp. 263-264). IEEE. (Year: 2015).*

(Continued)

*Primary Examiner* — Kim Y Vu
*Assistant Examiner* — Nathan J Bloom

(57) ABSTRACT

An electronic device, method, and computer readable medium for foveated storage and processing are provided. The electronic device includes a memory, and a processor coupled to the memory. The processor performs head tracking and eye tracking; generates a foveated image from an original image based on the head tracking and the eye tracking; and stores the foveated image using one of: a tile-based method or a frame-based method.

21 Claims, 12 Drawing Sheets

(56) References Cited

U.S. PATENT DOCUMENTS

| | | |
|---|---|---|
| 2015/0264335 A1 | 9/2015 | Park |
| 2017/0116459 A1 | 4/2017 | Chen et al. |
| 2017/0200308 A1 | 7/2017 | Nguyen et al. |
| 2017/0285736 A1 | 10/2017 | Young et al. |
| 2018/0040097 A1 | 2/2018 | Saleh et al. |
| 2018/0284872 A1* | 10/2018 | Schluessler ........... G06F 1/3265 |
| 2019/0273910 A1* | 9/2019 | Malaika ............... G02B 27/017 |
| 2019/0378305 A1* | 12/2019 | Fitzgerald ............ H04N 19/124 |

OTHER PUBLICATIONS

ISA/KR, International Search Report and Written Opinion of the International Searching Authority, International Application No. PCT/KR2019/005477, dated Aug. 14, 2019, 8 pages.

Gonzalez, M.; "Data-Driven Multiresolution Camera Using the Foveal Adaptive Pyramid"; Sensors; MDPI; Nov. 26, 2016; vol. 16; 27 pages.

Kortum, P.; "Implementation of a foveated image coding system for image bandwidth reduction"; SPIE Proceedings; University of Texas Center for Vision and Image Sciences; 1996; 13 pages.

Koskela, M.; "Foveated Path Tracing: a Literature Review and a Performance Gain Analysis"; Advances in Visual Computing: 12th International Symposium; Dec. 12-14, 2016; 11 pages.

Lee, S.; "Foveated Video Compression with Optimal Rate Control"; IEEE Transactions on Image Processing; Jul. 2001; vol. 10; No. 7; 16 pages.

* cited by examiner

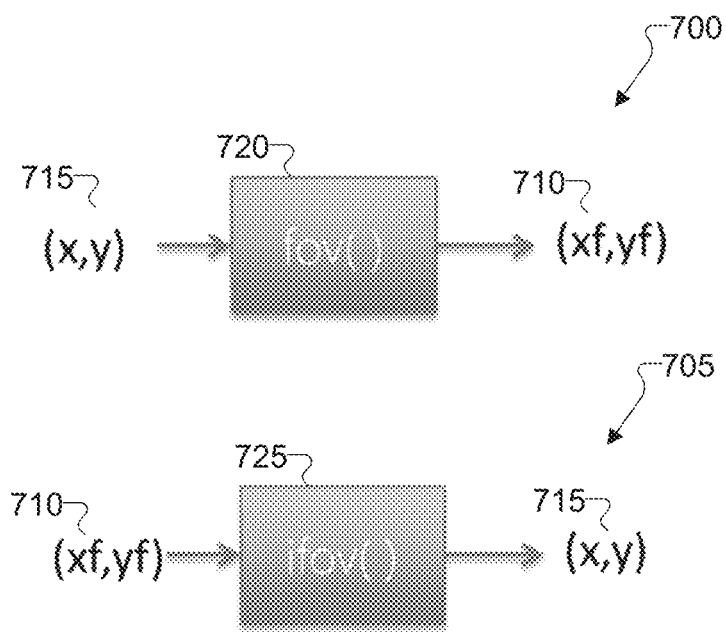
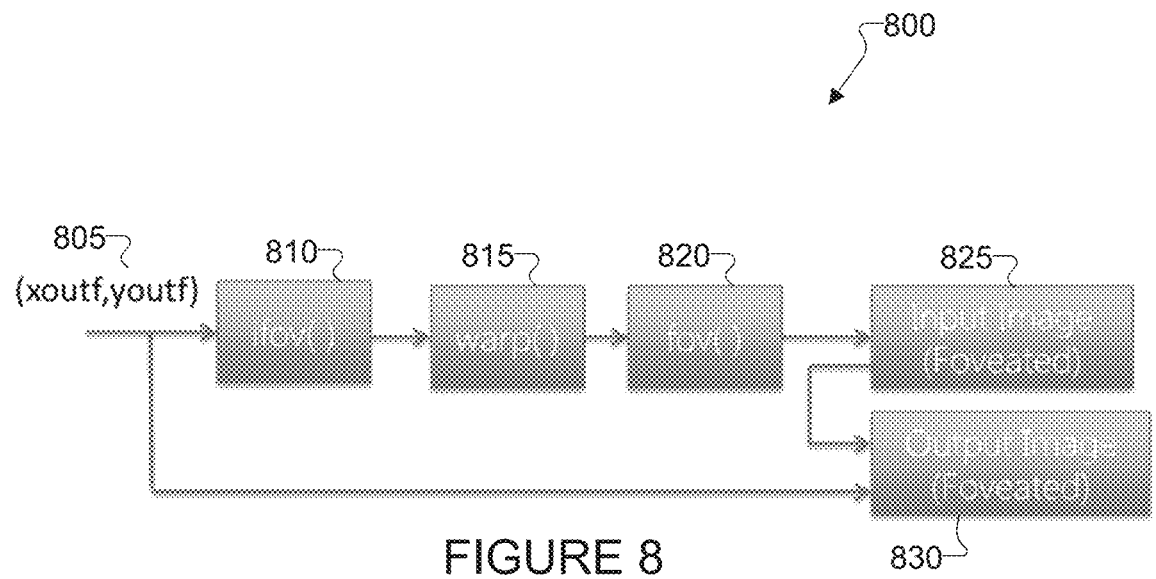
FIGURE 7
FIGURE 8

FOVEATED DOMAIN STORAGE AND PROCESSING

TECHNICAL FIELD

This disclosure relates generally to systems for image processing. More specifically, this disclosure relates to systems and methods for foveated domain storage and processing.

BACKGROUND

Rendering in augmented reality (AR) or virtual reality (VR) application present challenging requirements for the need to provide a good user interface (UX) experience. A typical field of view is 60 pixels horizontally (H) by 60 pixels vertically (V). The required resolution is 3600×3600 (60 pixels/degree assuming 20/20 vision accuracy is rendering) per eye. At a 60 Hz rate, the pixel rate requirement for a left eye and a right eye in RGB888 images are around 3600×3600×2×60×3=4,666 Mpixels/sec. In AR/VR applications, both pixel computation and DRAM bandwidth are proportional to these pixel rates.

SUMMARY

In one embodiment, an electronic device provides for foveated storage and processing. The electronic device includes a memory, and a processor coupled to the memory. The processor perform head tracking and eye tracking; generates a foveated image from an original image based on the head tracking and the eye tracking; and stores the foveated image using one of: a tile-based method or a frame-based method.

In a second embodiment, a method provides for foveated storage and processing. The method includes performing head tracking and eye tracking; generating a foveated image from an original image based on the head tracking and the eye tracking; and storing the foveated image using one of: a tile-based method or a frame-based method.

In a third embodiment, a non-transitory medium embodying a computer program provides for foveated storage and processing. The program code, when executed by at least one processor, causes a processor to perform head tracking and eye tracking; generate a foveated image from an original image based on the head tracking and the eye tracking; and store the foveated image using one of: a tile-based method or a frame-based method.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description, taken in conjunction with the accompanying drawings, in which:

FIG. 7 illustrates conversion of pixel address both to and from a foveated format according to embodiments of the present disclosure;

FIG. 8 illustrates a foveated warp function according to embodiments of the present disclosure;

DETAILED DESCRIPTION

Figure 1:
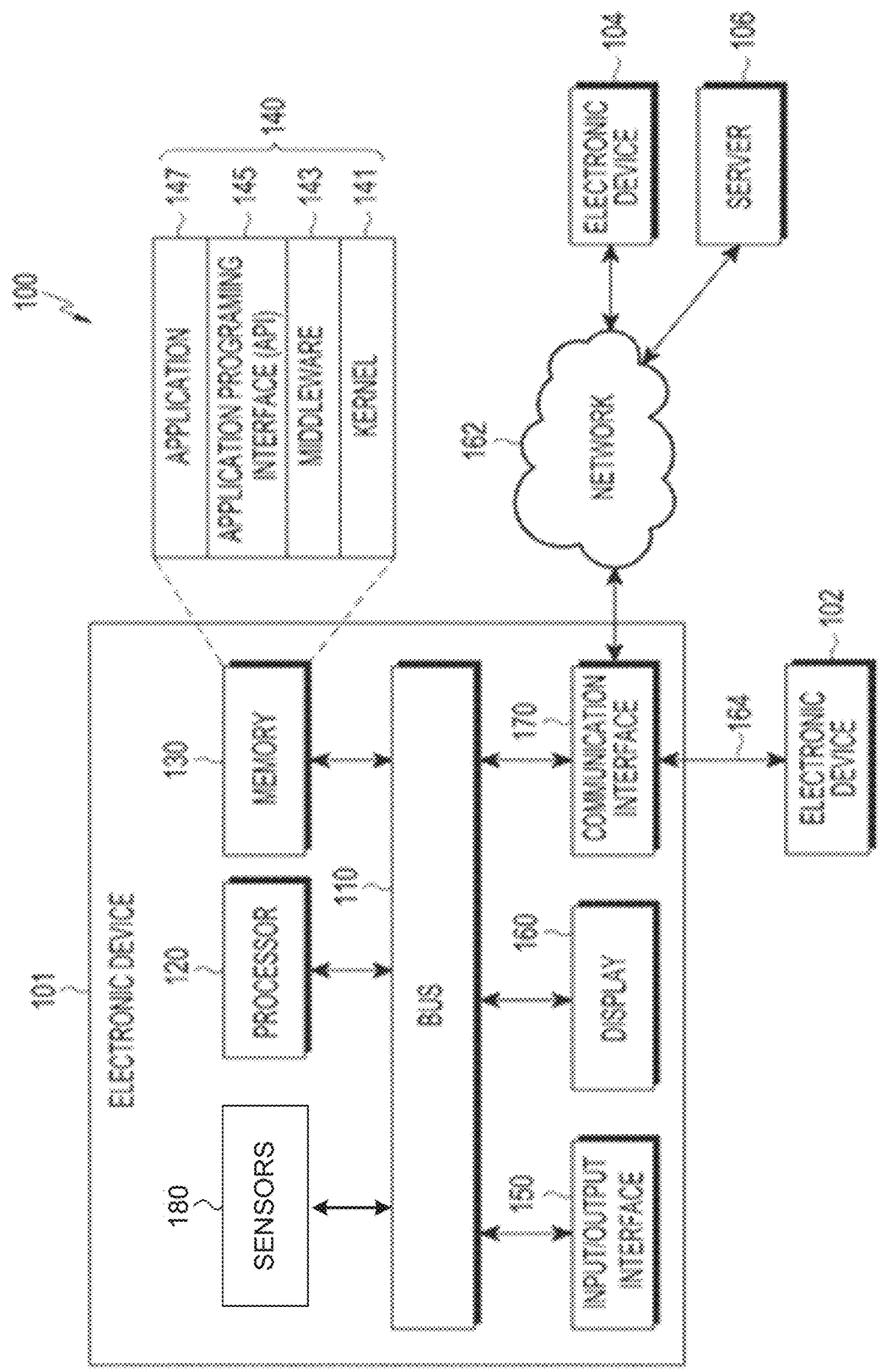
FIG. 1 illustrates an example network configuration according to embodiments of the present disclosure.

FIGS. 1 through 13, discussed below, and the various embodiments of the present disclosure are described with reference to the accompanying drawings. However, it should be appreciated that the present disclosure is not limited to the embodiments and all changes and/or equivalents or replacements thereto also belong to the scope of the present disclosure. The same or similar reference denotations may be used to refer to the same or similar elements throughout the specification and the drawings.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and do not limit the components. These terms are only used to distinguish one component from another. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts.

For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the present disclosure. It is to be understood that the singular forms "a," "'an," and "the" include plural references unless the context clearly dictates otherwise. All terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a PDA (personal digital assistant), a portable multimedia player (PMP), an MP3 player, a mobile medical device, a camera, or a wearable device (e.g., smart glasses, a head-mounted device (HMD), electronic clothes, an electronic bracelet, an electronic necklace, an electronic appcessory, an electronic tattoo, a smart mirror, or a smart watch).

Definitions for other certain words and phrases are provided throughout this patent document. Those of ordinary skill in the art should understand that in many if not most instances, such definitions apply to prior as well as future uses of such defined words and phrases.

According to embodiments of the present disclosure, the electronic device may be a smart home appliance. Examples of the smart home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, APPLE TV™, or GOOGLE TV™), a gaming console (XBOX™, PLAYSTATION™), an electronic dictionary, an electronic key, a camcorder, or an electronic picture frame.

According to an embodiment of the present disclosure, examples of the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller's machines (ATMs), point of sales (POS) devices, or Internet of Things devices (e.g., a bulb, various sensors, an electric or gas meter, a sprinkler, a fire alarm, a thermostat, a street light, a toaster, fitness equipment, a hot water tank, a heater, or a boiler).

According to certain embodiments of the disclosure, the electronic device can be at least one of a part of a piece of furniture or building/structure, an electronic board, an electronic signature receiving device, a projector, or various measurement devices (e.g., devices for measuring water, electricity, gas, or electromagnetic waves).

According to embodiments of the present disclosure, the electronic device is one or a combination of the above-listed devices. According to embodiments of the present disclosure, the electronic device is a flexible electronic device. The electronic device disclosed herein is not limited to the above-listed devices, and can include new electronic devices depending on the development of technology.

Hereinafter, electronic devices are described with reference to the accompanying drawings, according to various embodiments of the present disclosure. As used herein, the term "user" may denote a human or another device (e.g., an artificial intelligent electronic device) using the electronic device.

Instead of implementing image processing algorithms in full resolution, implement the algorithms in a foveated domain that requires less computation resources and DRAM bandwidth, improving in both processing throughput and power consumption. Using a foveated domain requires DRAM storage formats that are implementation friendly and can allow native image processing. Several use cases for foveated domain are disclosed based on eye tracking and head tracking inputs from sensor processing algorithms.

This application presents new foveated storage formats to reduce memory bandwidth and storage by using a separate format and tile format. A method is presented to compute algorithms like image warp in a foveated storage format. A method is presented to compensate for gaze direction change in a foveated storage format. A method is presented to compensate for head position change in a foveated storage format. A method is presented to compensate for both gaze direction change and head location change in a foveated storage format. A method is presented to compensate for head position change when an output is in full resolution and an input is in foveated format for streaming to a display. A method is presented to compensate for head position change when an input is in full resolution and an output is in foveated format. A method is presented to compensate for color aberration and/or lens distortion when an output is in full resolution and an input is in foveated format for streaming to a display. A method is presented to compensate for head position and color aberration and/or lens distortion when both an input and an output are in full resolution and intermediate image is in foveated format.

FIG. 1 illustrates an example network configuration 100 according to various embodiments of the present disclosure. The embodiment of the network configuration 100 shown in FIG. 1 is for illustration only. Other embodiments of the network configuration 100 could be used without departing from the scope of this disclosure.

According to an embodiment of the present disclosure, an electronic device 101 is included in a network environment 100. The electronic device 101 may include at least one of a bus 110, a processor 120, a memory 130, an input/output (IO) interface 150, a display 160, a communication interface 170, or sensors 180. In some embodiments, the electronic device 101 may exclude at least one of the components or may add another component.

The bus 110 includes a circuit for connecting the components 120 to 170 with one another and transferring communications (e.g., control messages and/or data) between the components.

The processor 120 includes one or more of a central processing unit (CPU), an application processor (AP), or a communication processor (CP). The processor 120 is able to perform control on at least one of the other components of the electronic device 101, and/or perform an operation or data processing relating to communication.

For example, the processor 120 can receive a plurality of frames captured by the camera during a capture event. The processor 120 can identify a salient region in each of the plurality of frames. The processor 120 can determine a reference frame from the plurality of frames based on the identified salient regions. The processor 120 can fuse non-reference frames with the determined reference frame into a completed frame. The processor 120 can operate the display to display the completed frame.

The memory 130 can include a volatile and/or non-volatile memory. For example, the memory 130 can store commands or data related to at least one other component of the electronic device 101. According to an embodiment of the present disclosure, the memory 130 can store software and/or a program 140. The program 140 includes, e.g., a kernel 141, middleware 143, an application programming interface (API) 145, and/or an application program (or "application") 147. At least a portion of the kernel 141, middleware 143, or API 145 may be denoted an operating system (OS).

For example, the kernel 141 can control or manage system resources (e.g., the bus 110, processor 120, or a memory 130) used to perform operations or functions implemented in other programs (e.g., the middleware 143, API 145, or application program 147). The kernel 141 provides an interface that allows the middleware 143, the API 145, or the application 147 to access the individual components of the electronic device 101 to control or manage the system resources.

The middleware 143 can function as a relay to allow the API 145 or the application 147 to communicate data with the kernel 141, for example. A plurality of applications 147 can be provided. The middleware 143 is able to control work requests received from the applications 147, e.g., by allocating the priority of using the system resources of the electronic device 101 (e.g., the bus 110, the processor 120, or the memory 130) to at least one of the plurality of applications 134.

The API 145 is an interface allowing the application 147 to control functions provided from the kernel 141 or the middleware 143. For example, the API 145 includes at least one interface or function (e.g., a command) for filing control, window control, image processing or text control.

The IO interface 150 serve as an interface that can, e.g., transfer commands or data input from a user or other external devices to other component(s) of the electronic device 101. Further, the IO interface 150 can output commands or data received from other component(s) of the electronic device 101 to the user or the other external device.

The display 160 includes, e.g., a liquid crystal display (LCD), a light emitting diode (LED) display, an organic light emitting diode (OLED) display, or a microelectromechanical systems (MEMS) display, or an electronic paper display. The display 160 is able to display, e.g., various contents (e.g., text, images, videos, icons, or symbols) to the user. The display 160 can include a touchscreen and may receive, e.g., a touch, gesture, proximity or hovering input using an electronic pen or a body portion of the user.

For example, the communication interface 170 is able to set up communication between the electronic device 101 and an external electronic device (e.g., a first electronic device 102, a second electronic device 104, or a server 106). For example, the communication interface 170 can be connected with the network 162 or 164 through wireless or wired communication to communicate with the external electronic device. The communication interface 170 can be a wired or wireless transceiver or any other component for transmitting and receiving signals, such as video feeds or video streams.

Electronic device 101 further includes one or more sensors 180 that can meter a physical quantity or detect an activation state of the electronic device 101 and convert metered or detected information into an electrical signal. For example, sensor 180 may include one or more buttons for touch input, a camera, a gesture sensor, a gyroscope or gyro sensor, an air pressure sensor, a magnetic sensor or magnetometer, an acceleration sensor or accelerometer, a grip sensor, a proximity sensor, a color sensor (e.g., a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an IR sensor, an ultrasound sensor, an iris sensor, a fingerprint sensor, etc. The sensor(s) 180 can further include a control circuit for controlling at least one of the sensors included therein. Any of these sensor(s) 180 may be located within the electronic device 101. A camera sensor 180 can capture a plurality of frames for a single image to be combined by the processor 120.

The first external electronic device 102 or the second external electronic device 104 may be a wearable device or an electronic device 101-mountable wearable device (e.g., a head mounted display (HMD)). When the electronic device 101 is mounted in a HMD (e.g., the electronic device 102), the electronic device 101 is able to detect the mounting in the HMD and operate in a virtual reality mode. When the electronic device 101 is mounted in the electronic device 102 (e.g., the HMD), the electronic device 101 can communicate with the electronic device 102 through the communication interface 170. The electronic device 101 can be directly connected with the electronic device 102 to communicate with the electronic device 102 without involving with a separate network.

The wireless communication is able to use at least one of, e.g., long term evolution (LTE), long term evolution-advanced (LTE-A), 5th generation wireless system (5G), mm-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include at least one of universal serial bus (USB), high definition multimedia interface (HDMI), recommended standard 232 (RS-232), or plain old telephone service (POTS).

The network 162 includes at least one of communication networks, e.g., a computer network (e.g., local area network (LAN) or wide area network (WAN)), Internet, or a telephone network.

The first and second external electronic devices 102 and 104 and server 106 each can be a device of the same or a different type from the electronic device 101. According to certain embodiments of the present disclosure, the server 106 includes a group of one or more servers. According to certain embodiments of the present disclosure, all or some of operations executed on the electronic device 101 can be executed on another or multiple other electronic devices (e.g., the electronic devices 102 and 104 or server 106). According to certain embodiments of the present disclosure, when the electronic device 101 should perform some function or service automatically or at a request, the electronic device 101, instead of executing the function or service on its own or additionally, can request another device (e.g., electronic devices 102 and 104 or server 106) to perform at least some functions associated therewith. The other electronic device (e.g., electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example.

Although FIG. 1 shows that the electronic device 101 includes the communication interface 170 to communicate with the external electronic device 104 or server 106 via the network 162, the electronic device 101 may be independently operated without a separate communication function, according to an embodiment of the present disclosure.

The server 106 can support to drive the electronic device 101 by performing at least one of operations (or functions) implemented on the electronic device 101. For example, the server 106 can include a processing module or processor that may support the processor 120 implemented in the electronic device 101.

Although FIG. 1 illustrates one example of a communication system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
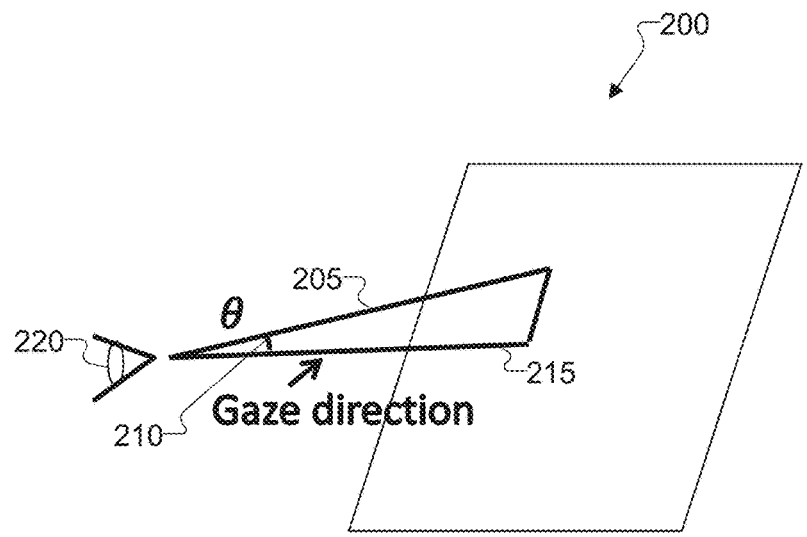
FIG. 2 illustrates an example of foveated rendering according to embodiments of the present disclosure.

FIG. 2 illustrates an example of foveated rendering 200 according to embodiments of the present disclosure. The embodiment of the foveated rendering 200 shown in FIG. 2 is for illustration only. Other embodiments of the foveated rendering 200 could be used without departing from the scope of this disclosure.

Foveated rendering 200 can reduce the amount of GPU workload for rendering AR or VR images. The minimum angle of resolution (MAR) 205 is the angular distance 210 from the central viewing or gaze direction 215 at the viewpoint 220. The MAR is determined by the following equation:

$$MAR(\theta) = \text{slope} * \theta + MAR(0)$$

$$MAR(0) = \left(\frac{1}{30}\right)\frac{deg}{\text{cycle}} \text{ for 20/20 vision}$$

where slope is equal to 0.22-0.34 degrees and pixels per degree is PPD=2/MAR. The MAR represents the outer perimeter of the capability of the eye to discern full resolution details. As the angle increases outside the MAR, the amount of resolution that an eye can perceive is reduced. More details regarding MAR are found in Guenter et. al., "Foveated 3D Graphics", ACM SIGGRAPH ASIA 2012, which is hereby incorporated by reference.

Figure 3:
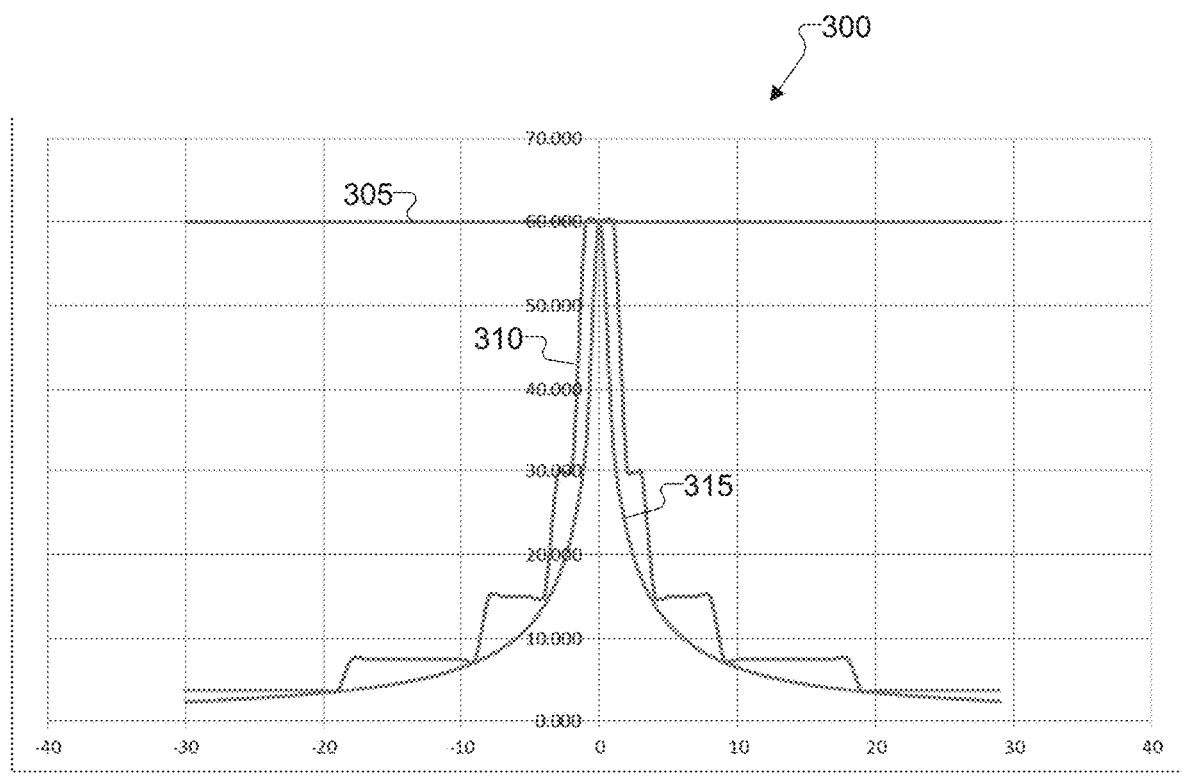
FIG. 3 illustrates an exemplary graph that presents no foveation, quantized foveation, and ideal foveation according to embodiments of the present disclosure.

FIG. 3 illustrates an exemplary graph 300 that presents no foveation 305, quantized foveation 310, and ideal foveation 315 according to embodiments of the present disclosure. The embodiment of the exemplary graph 300 shown in FIG. 3 is for illustration only. Other embodiments of the exemplary graph 300 could be used without departing from the scope of this disclosure.

The exemplary graph 300 illustrates the pixel resolution (ppd) versus angular distance from the center viewing or gaze direction. With no foveation 305, the pixel resolution is 60 ppd across the viewing spectrum, which is useful when there is movement of the gaze. This pixel resolution requires significant processing power, especially considering the wasted resolution outside the MAR area. The ideal foveation 315 provides the optimal in processing ability, but may experience difficultly with movements. Quantized foveation 310 provides a mixed benefit of the processing less as the angle increase, but has steps that require less pixels to be processed with movements of the gaze.

Figure 4:
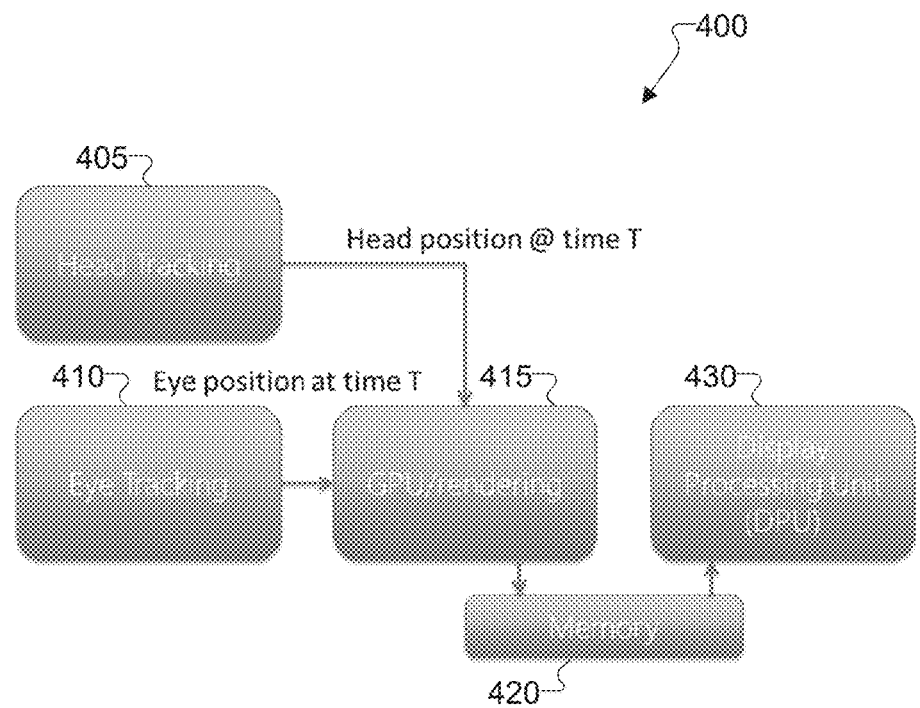
FIG. 4 illustrates an AR/VR system diagram according to embodiments of the present disclosure.

FIG. 4 illustrates an AR/VR system 400 according to embodiments of the present disclosure. The embodiment of the AR/VR system 400 shown in FIG. 4 is for illustration only. Other embodiments of the AR/VR system 400 could be used without departing from the scope of this disclosure.

The AR/VR system 400 manages the AR/VR experience. The AR/VR system 400 includes head tracking sensors 405, eye tracking sensors 410, rendering GPU 415, a memory 420, and a display processing unit (DPU) 430. The AR/VR system not only requires a high bandwidth, but also suffers from higher latency from head tracking to the DPU 430.

The head tracking sensors 405 can include outward facing optic sensors, gyrometer, etc. The head tracking sensor 405 monitors the vertical motion, horizontal motion, or rotation of the head. The head tracking sensor 405 outputs the head position at each time interval.

The eye tracking sensor 410 can include inward facing optic sensor focus on the eyes or any other sensor to monitor the movement of the eye. The eye tracking sensor 410 outputs the eye position at a time interval. The time interval for the eye tracking sensor 410 can be the same or different as the time interval for the head tracking sensor 405.

The rending GPU 415 handles the rendering workload and incorporate updates to the eye position and the head position. The rendering GPU 415 receives the head position from the head tracking sensors 405 and the eye position from the eye tracking sensor 410. The rendering GPU 415 can accommodate any difference in time intervals between the head tracking and the eye tracking.

The memory 420 stores the output of the rendering GPU 415. The DPU 430 reads the image or video files in the memory 420 and outputs the resulting video or image to a display.

Figure 5:
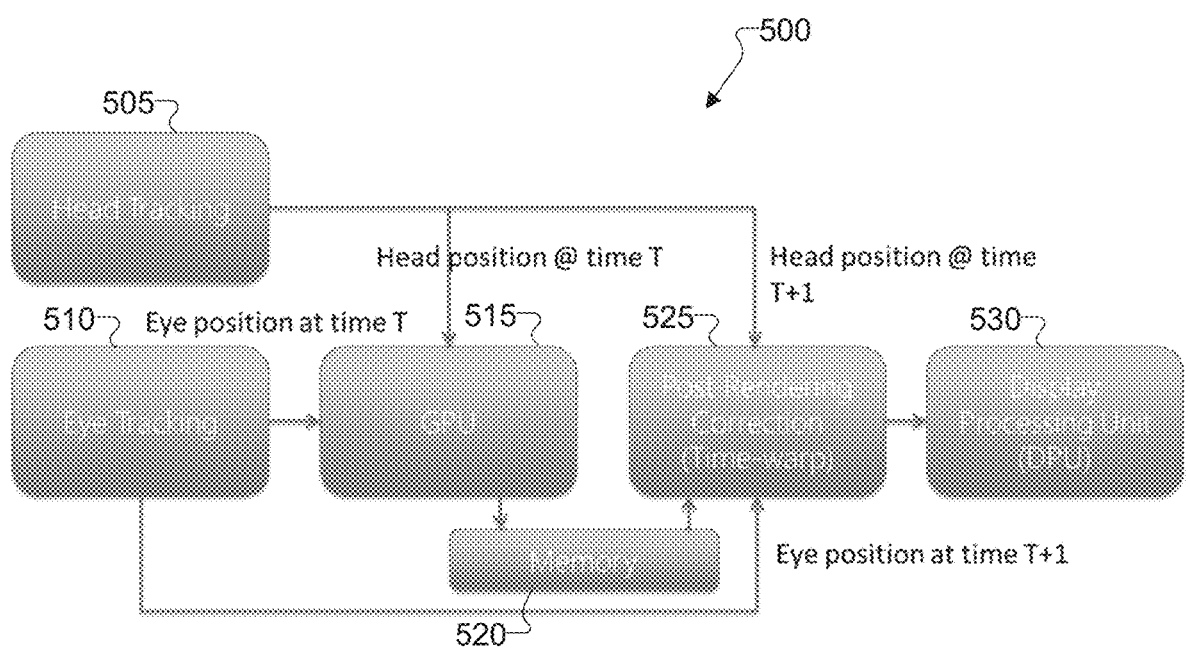
FIG. 5 illustrates an AR/VR system diagram with reduced latency via time-warp according to embodiments of the present disclosure.

FIG. 5 illustrates an AR/VR system 500 with reduced latency via time-warp according to embodiments of the present disclosure. The embodiment of the AR/VR system 500 shown in FIG. 5 is for illustration only. Other embodiments of the AR/VR system 500 could be used without departing from the scope of this disclosure.

The AR/VR system 500 provides for a reduced latency via time-warping of an AR or VR experience. The AR/VR system 500 includes head tracking sensors 505, eye tracking sensors 510, rendering GPU 515, memory 520, post-rending correction GPU 525, and DPU 530.

The head tracking sensors 505, eye tracking sensors 510, GPU 515, memory 520 and DPU 530, perform similarly to the respective components in FIG. 4. The head tracking sensors 505 and the eye tracking sensors 510 also output a head position and eye position to the post-rendering correction GPU 525 at one increment past the time that the head position is output to the GPU. The post-rendering correction GPU 525 performs post rendering correction that incorporates the latest head and eye position to optimize latency from the head position and eye position to the display. The post rendering correction requires high bandwidth and computation resources due to a high pixel rate.

Figure 6:
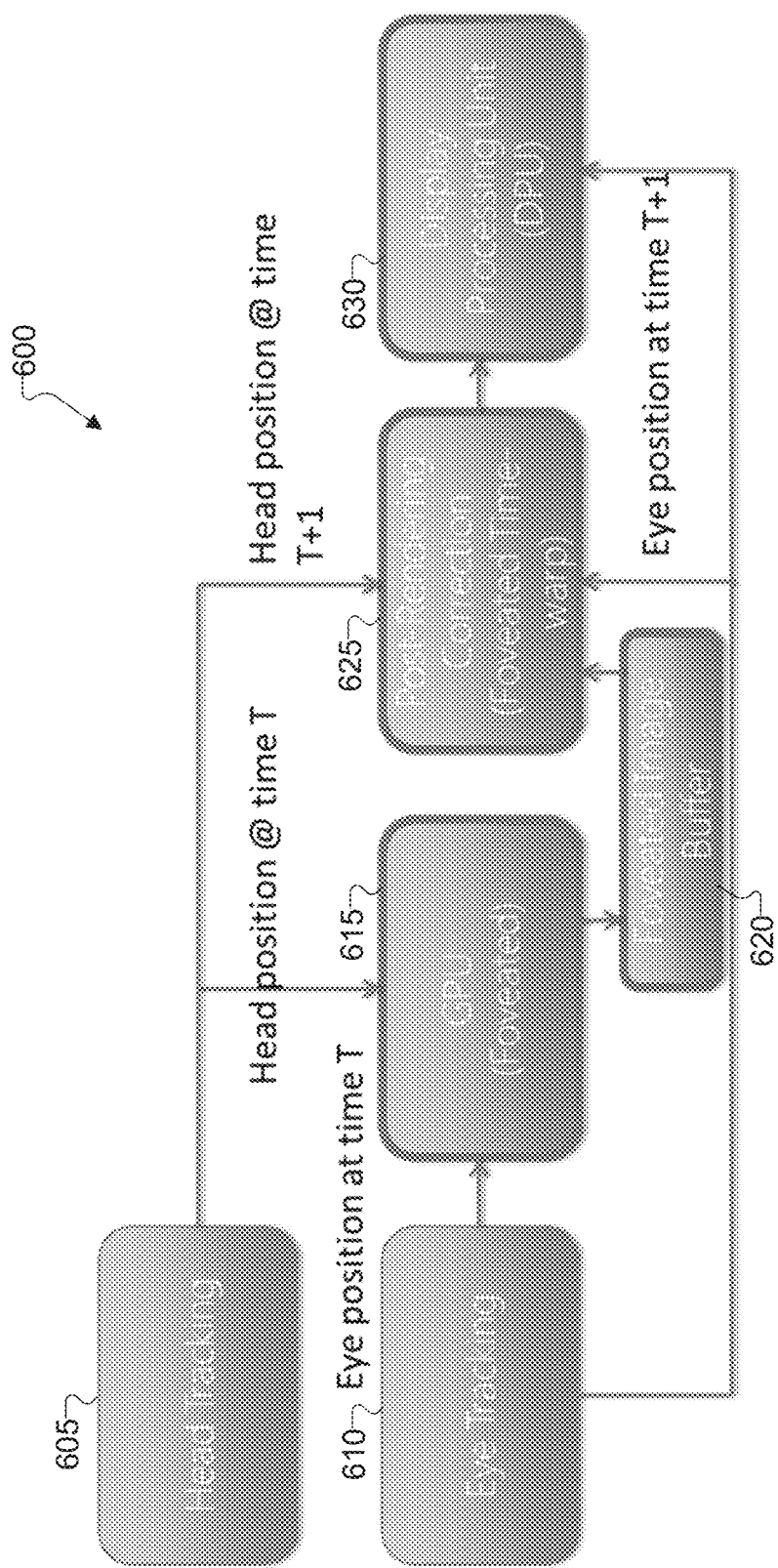
FIG. 6 illustrates a foveated system diagram with reduced DRAM BW/Power according to embodiments of the present disclosure.

FIG. 6 illustrates a foveated system 600 with reduced DRAM BW/Power according to embodiments of the present disclosure. The embodiment of the foveated system 600 shown in FIG. 6 is for illustration only. Other embodiments of the foveated system 600 could be used without departing from the scope of this disclosure.

The AR/VR system 600 provides for a reduced DRAM bandwidth and power of an AR or VR experience. The AR/VR system 600 includes head tracking sensors 605, eye tracking sensors 610, rendering GPU 615, foveated image buffer 520, post-rending correction GPU 525, and DPU 530.

The head tracking sensors 605, eye tracking sensors 610, GPU 615, post-rendering correction GPU 625 and DPU 630, perform similarly to the respective components in FIG. 5. The eye tracking sensors 510 also output a head position and eye position to the DPU 530 at one increment past the time that the head position is output to the GPU. Foveated rendering can be used for the rending GPU 615, post-rendering correction GPU 625 and the DPU 630 to reduce the memory bandwidth and pixel computation requirements.

Foveated rendering can include two formats of storage of foveated images in the foveated image buffer can be used including a tile-based method and a frame-based method. The tile-based method is where each tile is stored as a scaled tile. The tile-based method retains a random access and same memory layout at a frame level. A two-dimensional (2D) tile format where a resolution for a given tile is scaled as tiles are traversed from a fovea center outward. A tile of size (W, H) is addressed by its location (x,y). Now a scale factor (Sx,Sy) are defined in the following equations:

$$Sx = f(\|x-cx, y-cy\|)$$

$$Sy = g(\|x-cx, y-cy\|)$$

where ‖x−cx, y−cy‖ is a 2D distance (could be L1 or L2 norm) from an eye center (cx, cy). In this format, the location of a 2D tile does not change, but a number of pixels stored inside are scaled by (Sx,Sy) saving bandwidth while allowing random access of the pixels.

The frame-based method is where different resolutions within an image are specified by line and partition boundaries. The frame-based method optimizes memory storage and is suitable for faster scan access. The frame-based method can include a 2D separable format where Sx and Sy scale factors are defined by the following equations:

$$Sx = f(|x-cx|)$$

where |x−cx| is a horizontal distance from the eye center (cx,cy).

$$Sy = g(|y-cy|)$$

where |y−cy| is a vertical distance from the eye center (cx,cy).

Foveated rendering can include conversion between a foveated image format and a full resolution format. Foveated rendering can also include direct processing of algorithms in a foveated domain avoiding the conversion. Foveated rendering can also include a post-processing block for any blocking artifacts due to foveation, e.g. multi-resolution boundaries.

FIG. 7 illustrates conversions 700 of pixel addresses both to and from a foveated format according to embodiments of the present disclosure. The embodiment of the conversion of conversions 700 shown in FIG. 7 is for illustration only. Other embodiments of the conversion of conversions 700 could be used without departing from the scope of this disclosure.

Recomputing foveated pixel address 710 in the foveated format from or to the pixel address 715 in an original non-compressed format allows use of the pixels in either format for reading and writing. The conversion 700 of the pixel address 715 to a foveated pixel address 710 uses a foveation function 720. Conversion 700 from the pixel address 710 in full resolution to the foveated pixel address 710 in the foveated domain is defined by the following equations:

$$(xf, yf) = \text{fov}(x, y, cx, cy)$$

$$(cxf, cyf) = \text{fov}(cx, cy, cx, cy)$$

where (cxf,cyf) is the new fovea center. The fov( ) function provides conversion from full resolution to fovea resolution. (x',y')=fov(x,y,cx,cy) defines maps full resolution (x,y) pixel to foveated (x',y') pixels. This is used to access (x,y) pixel location in foveated image. This function is defined in this psuedo-code (fov_scl is fovea function as described in fovea format).

function[xf]=fov(x,c,W,p)

% given, fovea center c in full resolution image, full resolution image width Wand full resolution location x, parameter p indicating fovea region boundaries
  % find location xf in foveated image
  fovsum(1:W)=0;
  for idx=1:1:W
  fovsum (idx+1)=fovsum(idx)+fov_scl(idx,p);
  end
  cf(:,1)=fovsum(c(:,1)+1);
  xf(1,:)=cf(1,:)+sign(x(1,:)−c(1,:)).*fovsum(abs(x(1,:)−c(1,:))+1);
  xf(2,:)=cf(1,:)+sign(x(1,:)−c(1,:)).*fovsum(abs(x(1,:)−c(1,:))+1);
  end The conversion 700 of the foveated pixel address 715 to the pixel address 715 uses an inverse foveation function 725. Conversion 700 of the foveated pixel address 710 from the foveated domain to the pixel address 715 in full resolution is defined by the following equations:

$$(x, y) = \text{ifov}(xf, yf, cxf, cyf)$$

$$(cxf, cyf) = \text{ifov}(cxf, cyf, cxf, cyf)$$

The ifov( ) function provides conversion from fovea resolution to full resolution. (x',y')=fov(x,y,cx,cy) defines maps full resolution (x,y) pixel to foveated (x',y') pixels. This is used to access (x,y) pixel location in foveated image. This function is defined in this psuedo-code (ifov_scl is inverse fovea function).

function[x]=ifov(xf,cf,Wf,pf)

% Given, fovea center cf in fovea resolution image, fovea resolution image width Wf and fovea resolution location xf parameter pf indicating fovea region boundaries
  % find location x in full resolution image
  ifovsum(1:W)=0;
  for idx=1:1:W
  ifovsum(idx+1)=ifovsum(idx)+ifov_scl(idx,pf);
  end
  c(:,1) ifovsum(c(:,1)+1);
  x[1,:)=c(1,:)+sign(xf(1,:)−cf(1,:)).*ifovsum(abs(xf(1,:)−cf(1,:))+1);
  x(2,:)=c(1,:)+sign(xf(1,:)−cf(1,:)).*ifovsum(abs(xf(1,:)−cf(1,:))+1);
  end FIG. 8 illustrates a foveated warp function 800 according to embodiments of the present disclosure. The embodiment of the foveated warp function 800 shown in FIG. 8 is for illustration only. Other embodiments of the foveated warp function 800 could be used without departing from the scope of this disclosure.

The foveated warp function 800 includes inputs (xoutf, youtf) 805, an inverse foveation function 810, a warp function 815, foveation function 820, foveated input image 825 and foveated output image 830. The inputs 805, the foveated input image 825 and the foveated output image 830 are all in the foveated domain. Because the foveated domain reduces the amount of storage of different areas of an image, a warping in the foveated domain would not be consistent across the stored values. Thus, the image would need to be converted back to the original domain in order for consistent warping.

The foveated warp function 800 provides an alternative to conversion to a full resolution, only requiring pixel coordinates in the foveated domain. The inverse foveation function 810 and foveation warp function 820 are previously described to the respective function in FIG. 7. The warp function 815 in the foveated domain is defined by the following equations:

$$(xinf, yinf) = \text{fov}(\text{warp}(\text{ifov}(xoutf, youtf, cxf, cyf)), cx, cy)$$

where (cxf,cyf) is the fovea center for the foveated image and (cx,cy) is the center for the full image. All pixels coordinates are in the foveated domain and no intermediate conversion to full resolution is required, saving both computation resources and memory access bandwidth.

Figure 9:
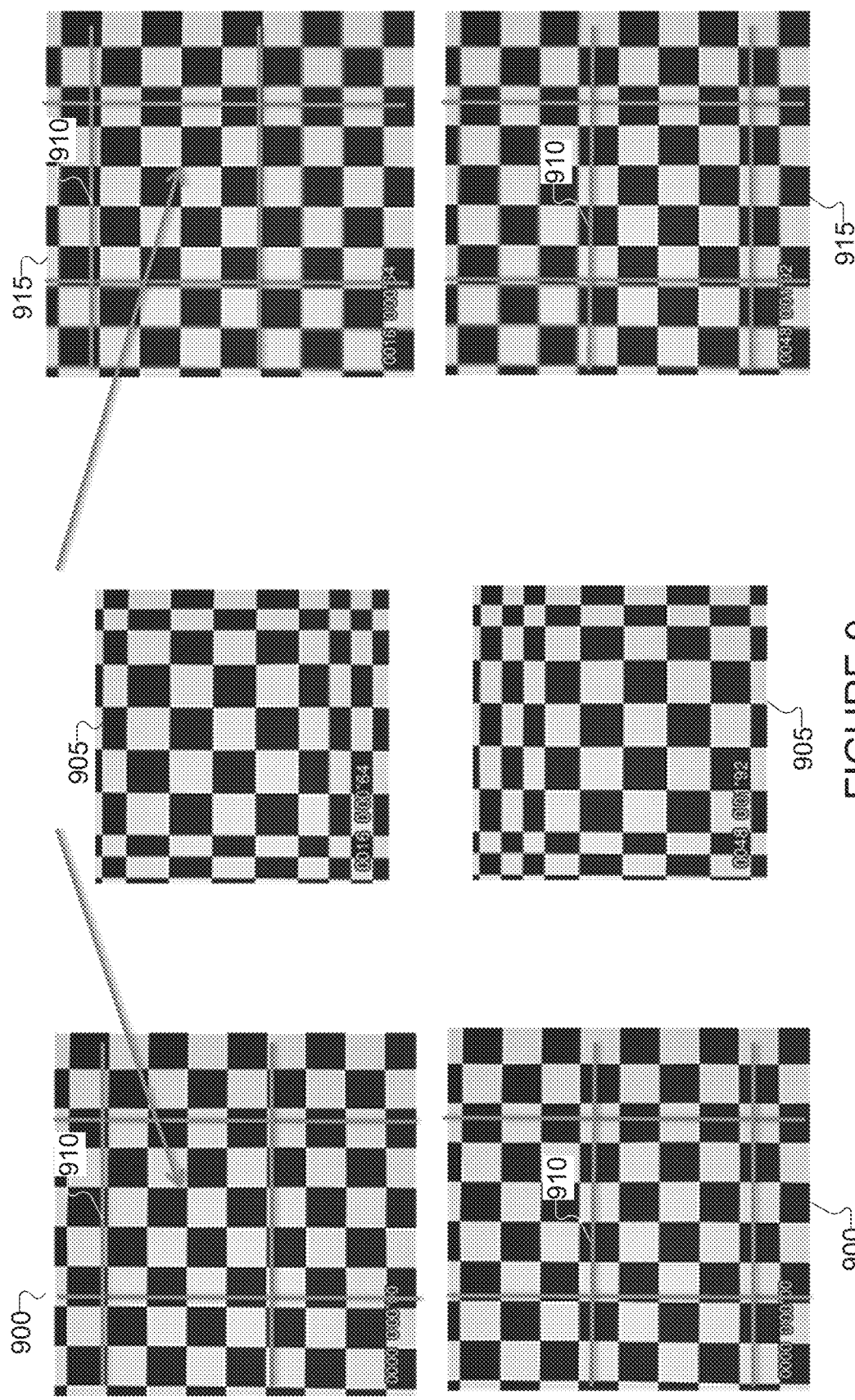
FIG. 9 illustrates original images, foveated image with a foveation focus and restored images according to the embodiments of the present disclosure.

FIG. 9 illustrates original images 900, foveated image 905 with a foveation focus 910 and restored images 915 according to the embodiments of the present disclosure. The embodiment of the original image 900, a foveated image 905 and a restored image 915 shown in FIG. 9 is for illustration only. Other embodiments of the original image 900, a foveated image 905 and a restored image 915 could be used without departing from the scope of this disclosure.

Figure 10A:
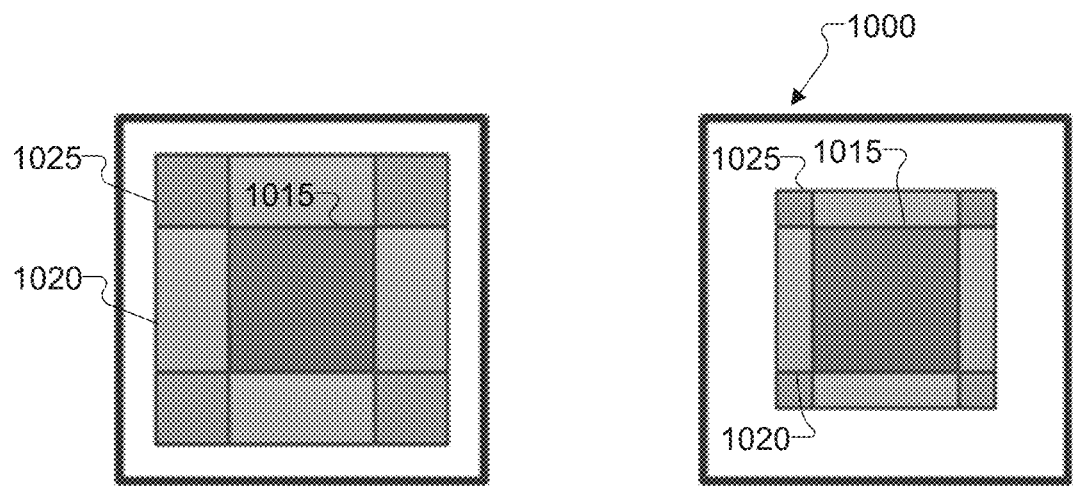
FIGS. 10A, 10B, and 10 C illustrate foveated format examples according to embodiments of the present disclosure.
Figure 10B:
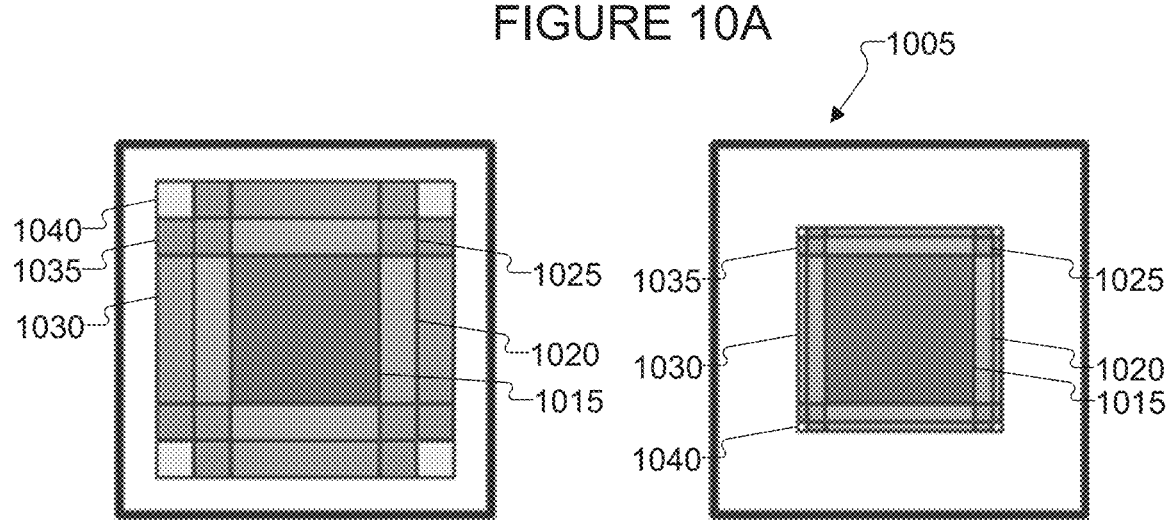
Figure 10C:
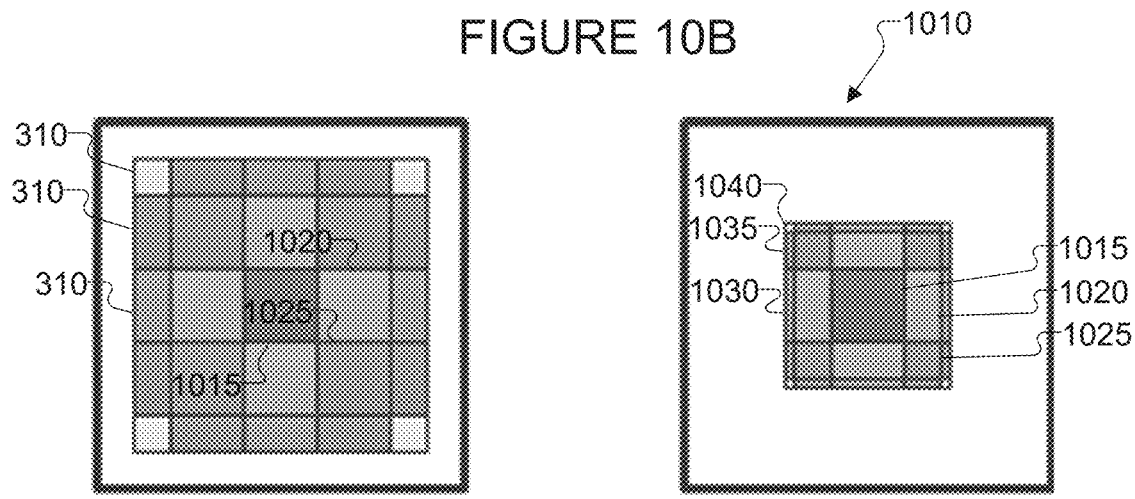

FIGS. 10A, 10B, and 10 C illustrate foveated format examples 1000, 1005, 1010 according to embodiments of the present disclosure. The embodiment of the foveated format examples 1000, 1005, 1010 shown in FIG. 10 is for illustration only. Other embodiments of the foveated format examples 1000, 1005, 1010 could be used without departing from the scope of this disclosure.

In the foveated format examples 1000, 1005, and 1010, the tiles are scaled at different levels based on a horizontal distance and a vertical distance from the gaze direction. In example 1000, the gaze direction is at the center of the gaze direction tile 1015. First side tiles 1020 are the tiles on the edges of the gaze direction tile 1015. In example 1000, the first side tiles 1020 are scaled down by a factor of 2×1. First corner tiles 1025 are the tiles that share two edges with different first side tiles 1020 and share a corner with the gaze direction tile 1015. The first corner tiles can be scaled by a factor of 2×2. The total compression of the foveated image example 1000 would be about 0.57 of the full image. The fovea function is defined by as Sx=f(|x−cx|), Sy=f(|y−cy|), where Sx and Sy are scale factors for pixel locations. The function f( ) is defined by the following equation:

$$f(x) = \begin{cases} 1, & x < W/4 \\ 0.5, & x \geq W/4 \end{cases}$$

In example 1005, the gaze direction tile 1015, first side tiles 1020, and first corner tiles 1025 can be scaled by the same factors as example 1000. A second side tile 1030 are tiles that share an edge of the first side tile 1020 opposite to the edge shared with the gaze direction tile 1015. The second side tile 1030 can be scaled by a factor of 4×1. The intermediate tiles 1035 share an edge with the second side tile 1030 and an edge with the first corner tile 1025. The intermediate tiles 1035 can be scaled by a factor of 4×2. The second corner tiles 1040 share two edges with different intermediate tiles 1035 and share a corner with a first corner tile 1025. The second corner tiles 1040 can be scaled down by a factor of 4×4. The total compression of the foveated image example 1005 would be about 0.36 of the full image. The fovea function is defined by as Sx=f(|x−cx|), Sy=f(|y−cy|), where Sx and Sy are scale factors for pixel locations. The function f( ) is defined by the following equation:

$$f(x) = \begin{cases} 1, & x < W/4 \\ 0.5, & \frac{W}{4} \leq x < 3W/8 \\ 0.25, & W \geq 3W/8 \end{cases}$$

In example 1010, scaling for each tile is the same as example 1005. The difference is that the tiles are all the same size, except for the tiles on the outer edges of the image. The total compression of the foveated image example 1005 would be about 0.32 of the full image. The fovea function is defined by as Sx=f(|x−cx|), Sy=f(|y−cy|), where Sx and Sy are scale factors for pixel locations. The function f( ) is defined by the same equation from example 1005.

Figure 11:
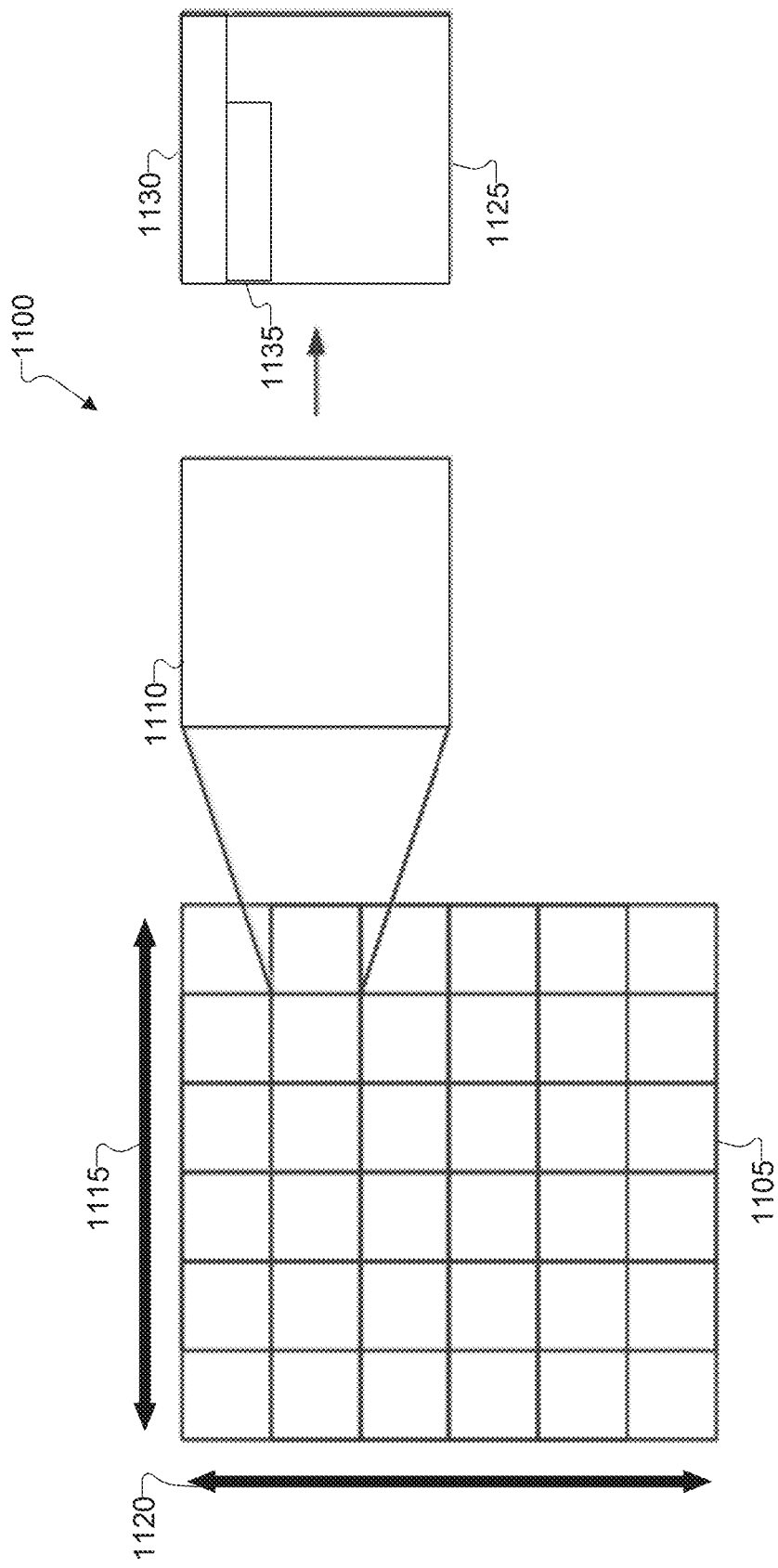
FIG. 11 illustrates a foveated tile storage format according to embodiments of the present disclosure.
Figure 12A:
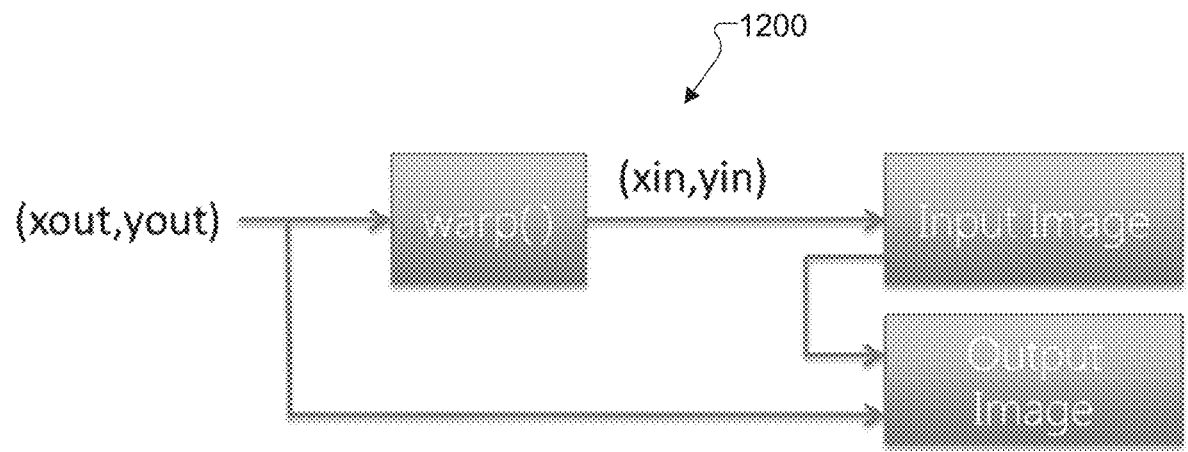
FIGS. 12A-12H illustrate example foveated functions according to embodiments of the present disclosure.
Figure 12B:
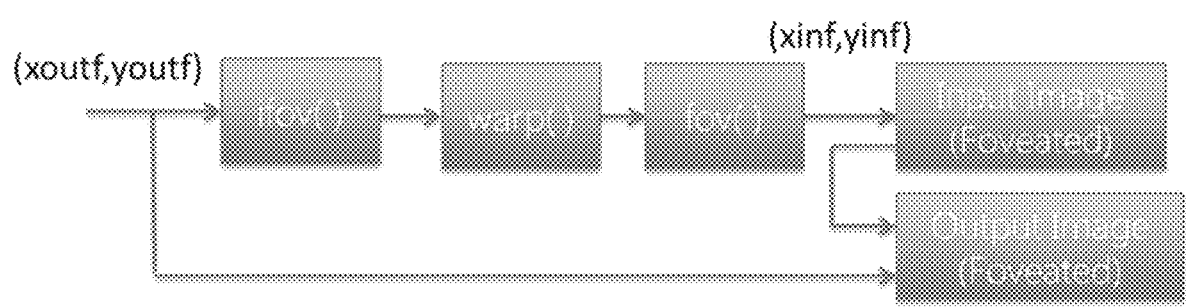
Figure 12C:
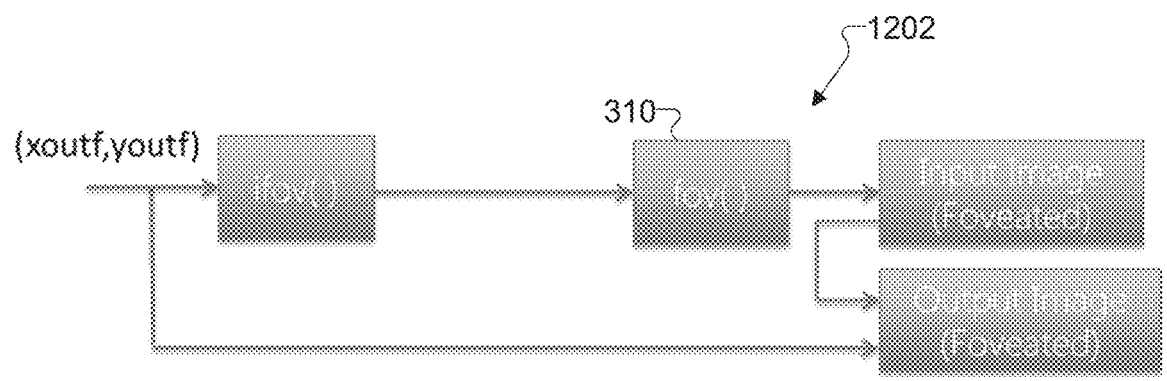
Figure 12D:
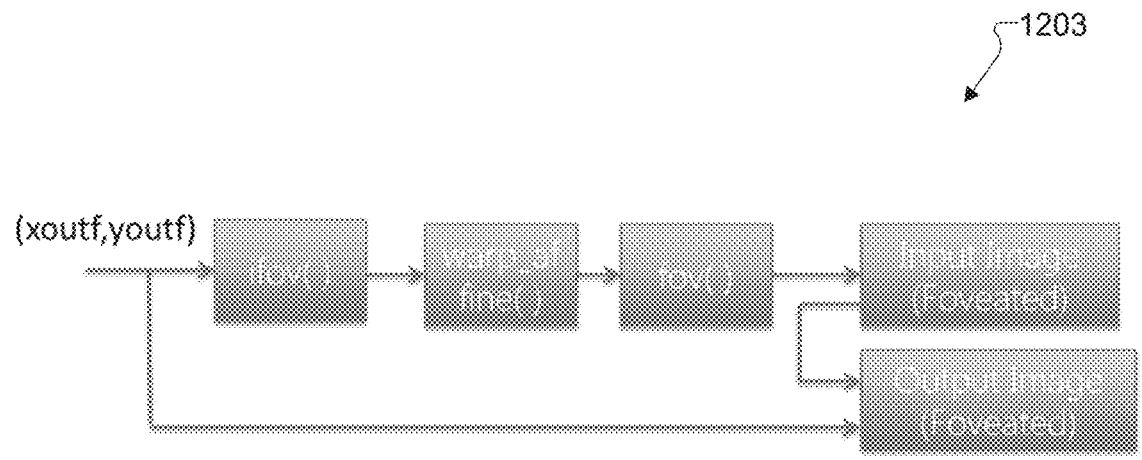
Figure 12E:
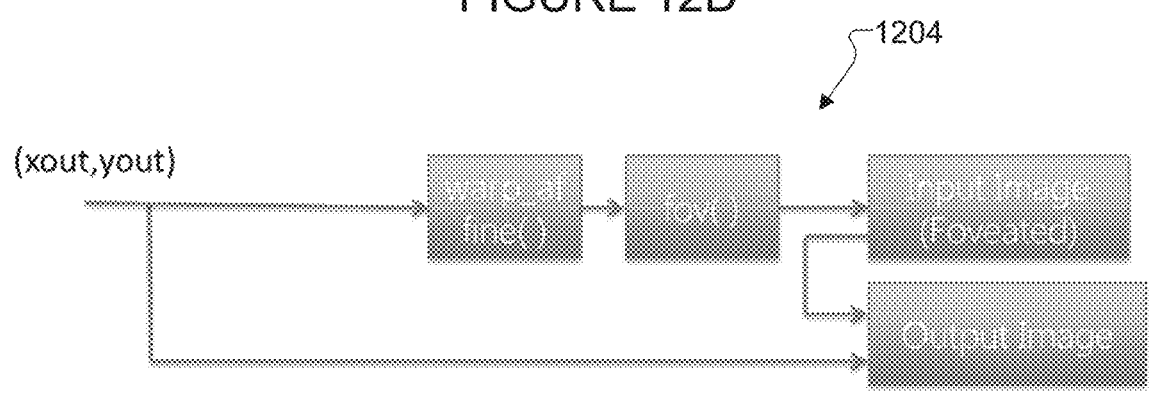
Figure 12F:
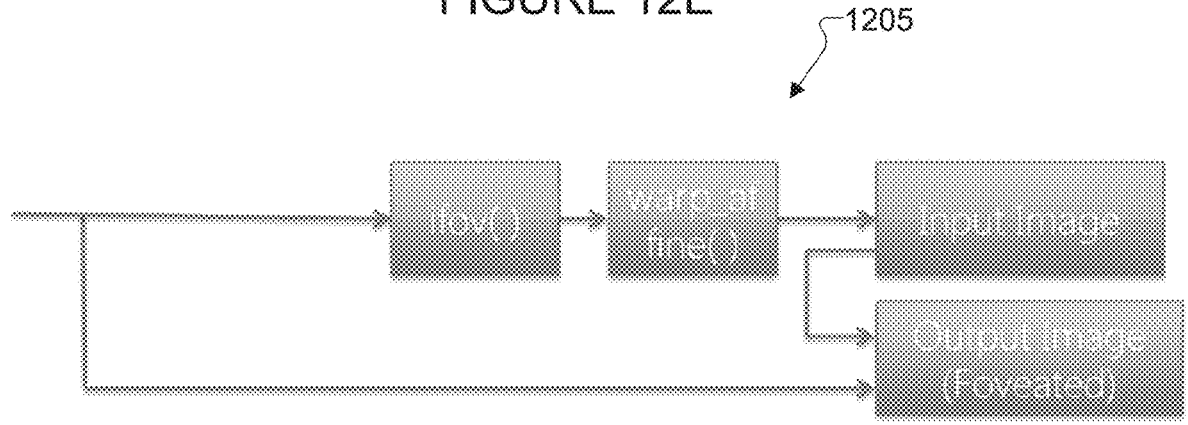
Figure 12G:
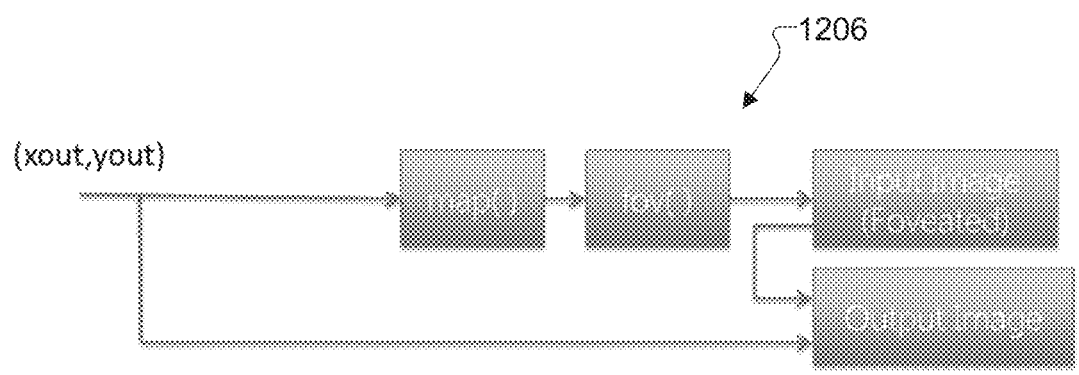
Figure 12H:
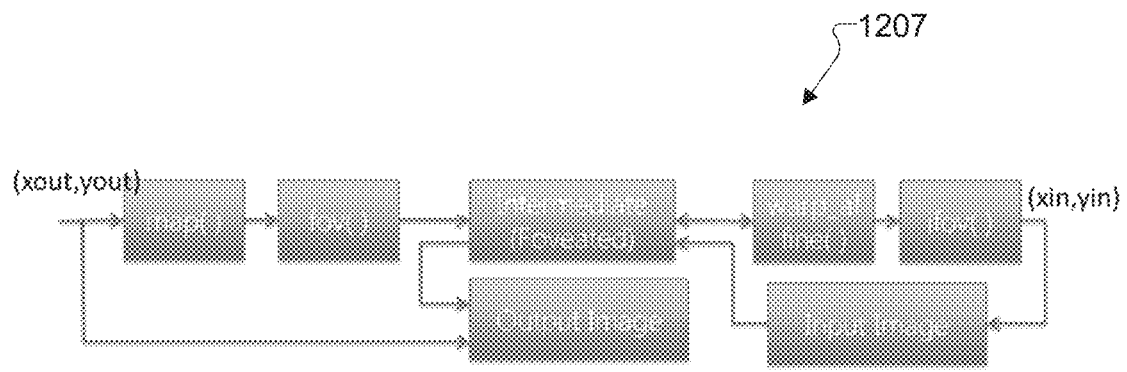

FIG. 11 illustrates a foveated tile storage format 1100 according to embodiments of the present disclosure. The embodiment of the foveated tile storage format 1100 shown in FIG. 11 is for illustration only. Other embodiments of the foveated tile storage format 1100 could be used without departing from the scope of this disclosure.

The image 1105 is split into a plurality of tiles 1110. The image 1105 has an image width 1115 and an image height 1120. The image width 1115 is equal to the tile width times the number of tiles 1110 per row. The image height 1120 is equal to the tile height times the number of tiles 1110 per column. In tile storage format, a first tile location (tx,ty) is found from the global coordinates (x,y). Then within the tile 1110, the local pixel location is found based on a scale factor sx,sy. The tile location does not change from the foveated domain to the full resolution domain. The foveated tile 1125 includes used locations 1130 and 1135. The foveated tile 1125 is the number of pixels equal to the product of tile width and the tile height over the product of the scale width times the scale height.

The fov( ) function for the tile storage format is defined by the following equations:

$$[xf, yf] = [tx, ty] + fov(x - tx, y - ty, sx, sy)$$
$$fov(x, y, sx, sy) = \left(\frac{x}{sx}, \frac{y}{sy}\right)$$

where the foveated coordinates can be accessed as a 1D array of size (x/sx,y/sy) to be more efficient in accessing within the allocated space of wx*wy for the tile.

Similarly, the ifov( ) function is defined by the following equations:

$$[x,y]=[tx,ty]+ifov(xf-tx,yf-ty,sx,sy)$$

$$fov(x,y,sx,sy)=(x*sx,y*sy)$$

where the foveated coordinates can be accessed as a 1D array of size (x/sx,y/sy) to be more efficient in accessing within the allocated space of wx*wy for the tile.

FIGS. 12A-12H illustrate example foveated functions 1200, 1201, 1202, 1203, 1204, 1205, 1206, 1207 according to embodiments of the present disclosure. The embodiment of the foveated functions 1200, 1201, 1202, 1203, 1204, 1205, 1206, 1207 shown in FIGS. 12A-12H are for illustration only. Other embodiments of the foveated functions 1200, 1201, 1202, 1203, 1204, 1205, 1206, 1207 could be used without departing from the scope of this disclosure.

Warp function 1200 is based on reverse mapping and is defined by (xin,yin)=warp (xout,yout). Where warp(x,y) can refer to a formula-based transformation (e.g., affine, perspective, radial, etc.) or a mesh-based look-up table or RAM.

Warp function 1201 in a foveated domain is defined as (xinf,yinf)=fov(warp(ifov(xoutf,yout,cxf,cyf)),cx,cy).

Where (cxf,cyf) is a fovea center for the foveated image and (cx,cy) is a center for the full image. All pixel coordinates are in a foveated domain and no intermediate conversion to a full resolution is required, saving both computation resources and memory access bandwidth.

Function 1202 illustrates a foveated gaze direction change. If a WARP function needs to accommodate for a change in gaze direction (i.e. center (cx,cy) of central region), the accommodation can be performed by using different address calculations for the input and output sides. The foveated gaze direction change function 1202 is defined by the following equation:

$$(xinf,yinf)=fov((ifov(xout,youtf,cxoutf,cyoutf)),cxin,cyin)$$

where (cxin,cyin) and (cxoutf,cyoutf) are center points in the input image and the output image.

Function 1203 illustrates a foveated head position change. If both a gaze direction and a head position changes, then the WARP function is defined by an affine matrix. The foveated head position change function 1203 is defined by the following equation:

$$(xin,yin)=fov((warp\_affine(ifov(xoutf,youtf,cxf,cyf)),cx,cy)$$

where (cx,cy) are the center points for the input image and the output image.

For a warp function for both a foveated gaze direction and a head position change, the WARP function is defined by an affine matrix. The foveated gaze direction and head position change WARP function 1203 is defined by the following equation:

$$(xin,yin)=fov((warp\_affine(ifov(xoutf,youtf,cxoutf,cyoutf)),cxin,cyin)$$

where (cxin,cyin) and (cxoutf,cyout) are the center points for the input image and the output image.

Function 1204 illustrates a foveated head position change with a full resolution output. If a head position changes while the output is streamed to a display in full resolution format while the input is in foveated format, then the WARP function is defined by an affine matrix. The foveated head position change with a full resolution output function 1204 is defined by the following equation:

$$(xin,yin)=fov((warp\_affine(xoutf,youtf),cx,cy)$$

where (cxf,cyf) is the center point for the input image.

Function 1205 illustrates a foveated head position change with a full resolution input. If a head position changes while the output is streamed to a display in foveated resolution format while the input is in full resolution format, then the WARP function is defined by an affine matrix. The foveated head position change with a full resolution input function 1205 is defined by the following equation:

$$(xin,yin)=(warp\_affine(ifov(xoutf,youtf,cxoutf,cyoutf))$$

where (cxoutf,cyoutf) is the center point for the input foveated image.

Function 1206 illustrates a foveated lens distortion correct. If color aberration and/or lens distortion correction is required while the output is streamed to a display in full resolution format while the input is in foveated format, then the WARP function is defined by an either a LUT-based mesh or radial distortion function. The foveated lens distortion correct function 1206 is defined by the following equation:

$$(xin,yin)=(map(ifov(xoutf,youtf,cxf,cyf)))$$

where (cxf,cyf) is the center point for the input foveated image.

Function 1206 illustrates a foveated head position correction and lens distortion correct. If head position change and/or color aberration and/or lens distortion correction is required while both the input image and the output image are in full resolution format, then an intermediate storage can be in a foveated format. The warp affine for head rotation of the function 1206 is defined by the following equation:

$$(xin,yin)=(warp\_affine(ifov(xintf,yintf,cxf,cyf)))$$

where (cxf,cyf) is the center point for the intermediate foveated image. The lens distortion correction of the function 1206 is defined by the following equation:

$$(xintf,yintf)=fov(map(xout,yout),cx,cy)$$

It is possible that an input and an output for fovea parameters are different. Sometimes the input is allowed to have wider fovea to allow a shift in the fovea center from input to output or because of change in orientation. In this situation, parameter p is passed inside fov( ) and ifov( ) functions as shown in psuedo-codes. For example, initial rendering from GPU could be done with wider fovea and then final post-rendering correction can be done with more compact fovea.

It is possible to use foveated rendering based on lighting parameters instead of gaze direction. For example, the resolution on a certain portion of the image could be based on lighting in that portion of the image. This can be done by splitting an image based on lighting conditions. A tile-based strategy should work the best where the tile is defined by tile lighting conditions to derive required resolution in that tile.

It is possible for post rendering correction block to apply delta correction only based on some movements in certain object. In that case only the moving portion of the image needs to be updated. This can be done by estimating motion map across the image and then warping based on that motion map. This warping operation can be done in natively foveated domain instead of full resolution similar to time-warp.

Figure 13:
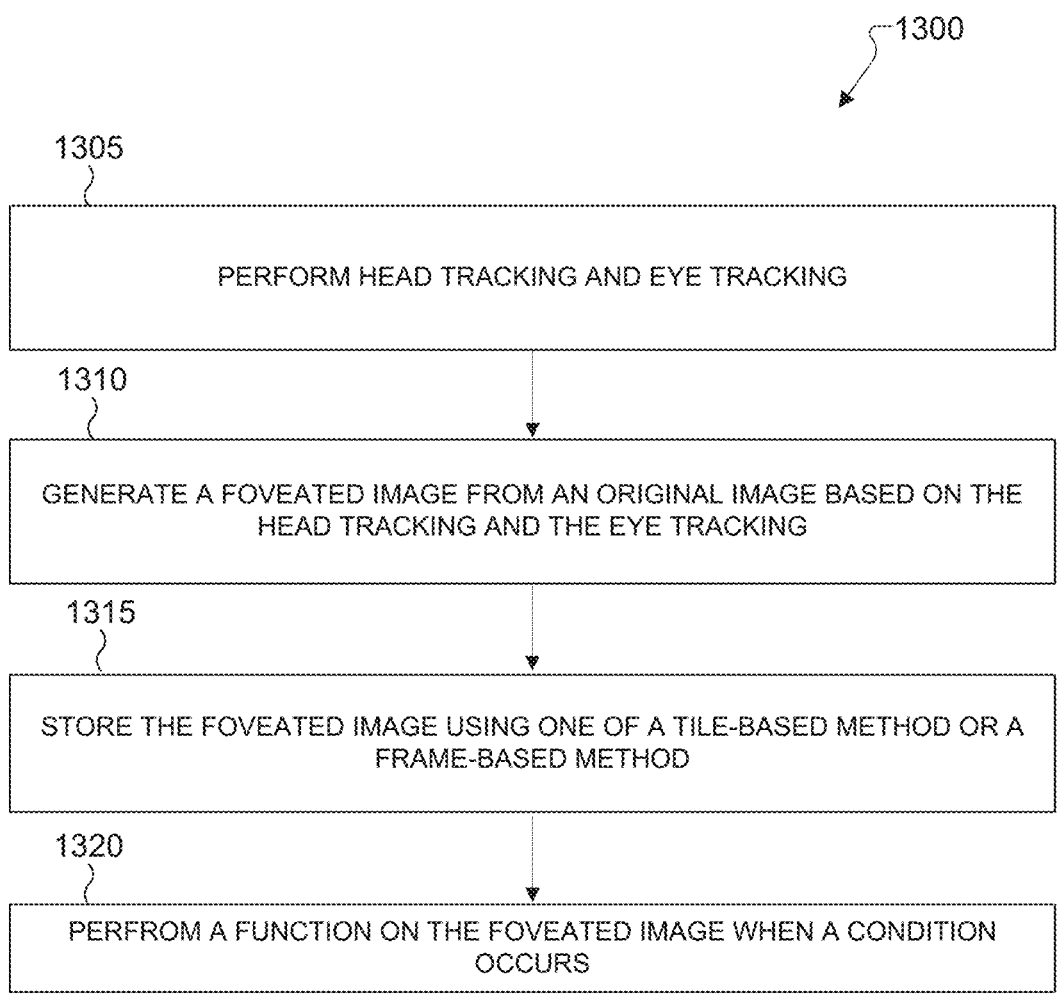
FIG. 13 illustrates an exemplary process flow diagram showing a method for foveated domain storage and processing according to embodiments of the present disclosure.

FIG. 13 illustrates an exemplar flow diagram 1300 for foveated domain storage and processing according to the various embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in FIG. 13 can be performed by the electronic device 101 in FIG. 1.

In operation 1305, the electronic device 101 performs head tracking and eye tracking. The electronic device uses the position and angle of the head to determine the image frame and focus of the eyes to determine a gaze direction.

In operation 1310, the electronic device 101 generates a foveated image from an original image based on the head tracking and the eye tracking. The foveated image uses a step reduction in resolution based on the angular distance from the gaze direction.

In operation 1315, the electronic device 101 stores the foveated image using one of a tile-based method or a frame-based method. The tile-based method includes dividing the original image into a plurality of tiles and scaling each of the plurality of tiles based on a distance of each tile from a gaze direction, where the foveated image is further generated based on the plurality of scaled tiles. The frame-based method includes applying a scale factor for each pixel based on a horizontal distance and a vertical distance from the gaze direction.

In operation 1320, the electronic device 101 performs a function on the foveated image when a condition occurs. The function that is performed can be any of functions 1200-1207.

Although FIG. 13 illustrates an example process, various changes could be made to FIG. 13. For example, while shown as a series of steps, various steps in each figure could overlap, occur in parallel, occur in a different order, or occur multiple times.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. An electronic device for foveated domain storage and processing, the electronic device comprising:
 a memory; and
 a processor coupled to the memory, the processor configured to:
  perform head tracking and eye tracking;
  generate a foveated image from an original image based on the head tracking and the eye tracking, wherein the processor is configured to use a selected one of multiple warping functions based on whether there is a change in a head position, a change in a gaze direction, or changes in both the head position and the gaze direction; and
  store the foveated image using one of: a tile-based method or a frame-based method,
 wherein, in the tile-based method, the processor is further configured to:
  divide the original image into a plurality of tiles; and
  scale each of the plurality of tiles based on a distance of each tile from the gaze direction, wherein the processor is configured to generate the foveated image based on the plurality of scaled tiles, and
 wherein, in the frame-based method, the processor is further configured to apply a scale factor for each pixel based on a horizontal distance and a vertical distance from the gaze direction.

2. The electronic device of claim 1, wherein the processor is further configured to convert the original image to the foveated image using a foveation function for each pixel.

3. The electronic device of claim 1, wherein the selected warping function computes a warp in a foveated domain without intermediate conversion to a full format.

4. The electronic device of claim 1, wherein the selected warping function uses a different address calculation for an input image and an output image to accommodate for the change in the gaze direction.

5. The electronic device of claim 1, wherein the selected warping function uses an affine matrix when the head position changes.

6. The electronic device of claim 1, wherein the selected warping function is defined by either a look-up table (LUT)-based mesh or a radial distortion function if a color aberration or lens distortion correction is required while an output image is streamed to display in full resolution and an input image is in a foveated format.

7. The electronic device of claim 6, wherein the processor is further configured to store an intermediate image in a foveated format if compensation for the change in the head position, the color aberration, or the lens distortion is required while both the input image and the output image are stored in full format.

8. A method for foveated storage and processing comprising:
performing head tracking and eye tracking;
generating a foveated image from an original image based on the head tracking and the eye tracking, wherein a selected one of multiple warping functions is used based on whether there is a change in a head position, a change in a gaze direction, or changes in both the head position and the gaze direction; and
storing the foveated image using one of: a tile-based method or a frame-based method,
wherein the tile-based method comprises:
dividing the original image into a plurality of tiles; and
scaling each of the plurality of tiles based on a distance of each tile from the gaze direction, wherein the foveated image is further generated based on the plurality of scaled tiles, and
wherein the frame-based method comprises applying a scale factor for each pixel based on a horizontal distance and a vertical distance from the gaze direction.

9. The method of claim 8, further comprising:
converting the original image to the foveated image using a foveation function for each pixel.

10. The method of claim 8, wherein the selected warping function computes a warp in a foveated domain without intermediate conversion to a full format.

11. The method of claim 8, wherein the selected warping function uses a different address calculation for an input image and an output image to accommodate for the change in the gaze direction.

12. The method of claim 8, wherein the selected warping function uses an affine matrix when the head position changes.

13. The method of claim 8, wherein the selected warping function is defined by either a look-up table (LUT)-based mesh or a radial distortion function if a color aberration or lens distortion correction is required while an output image is streamed to display in full resolution and an input image is in a foveated format.

14. The method of claim 13, further comprising:
storing an intermediate image in a foveated format if compensation for the change in the head position, the color aberration, or the lens distortion is required while both the input image and the output image are stored in full format.

15. A non-transitory computer readable medium embodying a computer program, the computer program comprising computer readable program code that when executed causes at least one processor to:
perform head tracking and eye tracking;
generate a foveated image from an original image based on the head tracking and the eye tracking, wherein a selected one of multiple warping functions is used based on whether there is a change in a head position, a change in a gaze direction, or changes in both the head position and the gaze direction; and
store the foveated image using one of: a tile-based method or a frame-based method,
wherein, in the tile-based method, the computer readable program code causes the at least one processor to:
divide the original image into a plurality of tiles; and
scale each of the plurality of tiles based on a distance of each tile from the gaze direction, wherein the foveated image is further generated based on the plurality of scaled tiles, and
wherein, in the frame-based method, the computer readable program code causes the at least one processor to apply a scale factor for each pixel based on a horizontal distance and a vertical distance from the gaze direction.

16. The non-transitory computer readable medium of claim 15, wherein the computer program further comprises computer readable program code that when executed causes at least one processor to:
convert the original image to the foveated image using a foveation function for each pixel.

17. The non-transitory computer readable medium of claim 15, wherein the selected warping function computes a warp in a foveated domain without intermediate conversion to a full format.

18. The non-transitory computer readable medium of claim 15, wherein the selected warping function uses a different address calculation for an input image and an output image to accommodate for the change in the gaze direction.

19. The non-transitory computer readable medium of claim 15, wherein the selected warping function uses an affine matrix when the head position changes.

20. The non-transitory computer readable medium of claim 15, wherein the selected warping function is defined by either a look-up table (LUT)-based mesh or a radial distortion function if a color aberration or lens distortion correction is required while an output image is streamed to display in full resolution and an input image is in a foveated format.

21. The non-transitory computer readable medium of claim 20, wherein the computer program further comprises computer readable program code that when executed causes at least one processor to:
store an intermediate image in a foveated format if compensation for the change in the head position, the color aberration, or the lens distortion is required while both the input image and the output image are stored in full format.

* * * * *